(12) United States Patent
Kim (10) Patent No.: US 11,560,048 B2
(45) Date of Patent: Jan. 24, 2023

(54) ACTIVE AIR FLAP DEVICE FOR VEHICLE

(71) Applicant: HYUNDAI MOBIS Co., Ltd., Seoul (KR)

(72) Inventor: Jang Ho Kim, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 139 days.

(21) Appl. No.: 17/035,632

(22) Filed: Sep. 28, 2020

(65) Prior Publication Data

US 2021/0114670 A1  Apr. 22, 2021

(30) Foreign Application Priority Data

Oct. 22, 2019 (KR) .................. 10-2019-0131188

(51) Int. Cl.
    *B60K 11/08* (2006.01)
    *B62D 35/00* (2006.01)

(52) U.S. Cl.
    CPC .......... *B60K 11/085* (2013.01); *B62D 35/005* (2013.01)

(58) Field of Classification Search
    CPC ...... B60K 11/04; B60K 11/085; B62D 35/005
    USPC ........................................ 296/180.3
    See application file for complete search history.

(56) References Cited

U.S. PATENT DOCUMENTS

| 10,059,193 | B2 * | 8/2018 | Ayala ..................... B60R 19/52 |
| 10,730,384 | B1 * | 8/2020 | Klop .................... B60K 11/085 |
| 11,279,221 | B2 * | 3/2022 | Parra ..................... B62D 35/005 |
| 2014/0039765 | A1 * | 2/2014 | Charnesky ............ B60K 11/085 701/49 |
| 2014/0094104 | A1 * | 4/2014 | Manhire ............... B60K 11/085 454/152 |
| 2014/0273806 | A1 * | 9/2014 | Frayer, III ........... B60K 11/085 454/335 |
| 2017/0113539 | A1 * | 4/2017 | Prior .................... B60K 11/085 |

FOREIGN PATENT DOCUMENTS

| DE | 102018004361 A1 * | 12/2019 | |
| EP | 3109084 A1 * | 12/2016 | ........... B60K 11/085 |
| GB | 2131150 A * | 6/1984 | ........... B60K 11/085 |
| KR | 10-2011-0134698 | 12/2011 | |

OTHER PUBLICATIONS

English translation of DE 10 2018 004 361; retrieved via Patent-Translate located at www.epo.org. (Year: 2022).*

* cited by examiner

*Primary Examiner* — Jason S Daniels (74) *Attorney, Agent, or Firm* — H.C. Park & Associates, PLC (57) ABSTRACT

An active air flap device for a vehicle may include: a housing part mounted in a bumper cover part; one or more flap parts rotatably mounted in the housing part, and exposed to the outside through a hole formed in the bumper cover part to form the same skin line as the bumper cover part; a link part connected to the flap part; a loader part mounted in the link part; and a driving part configured to rotate the loader part.

8 Claims, 10 Drawing Sheets

ACTIVE AIR FLAP DEVICE FOR VEHICLE

CROSS-REFERENCE TO RELATED APPLICATION

This application claims priority from and the benefit of Korean Patent Application No. 10-2019-0131188, filed on Oct. 22, 2019, which is hereby incorporated by reference for all purposes as if set forth herein.

BACKGROUND

Field

Exemplary embodiments of the present disclosure relate to an active air flap device for a vehicle, and more particularly, to an active air flap device for a vehicle, in which a rotating shaft and an operating shaft of a flap are designed differently from each other such that a bumper cover and the flap can form the same skin line.

Discussion of the Background

In general, a vehicle has a radiator grill installed at the front surface thereof, the radiator grill serving to introduce air into an engine room of the vehicle. The air introduced through the radiator grill is used to cool various coolers such as a radiator.

When the vehicle travels at high speed, a flow of air introduced into the engine room through the radiator grill serves as resistance to the traveling of the vehicle. In order to solve such a problem, an active air flap is recently applied to open/close the radiator grill.

In the related art, however, since a flap is rotated about a shaft of an actuator, an operating shaft and a rotating shaft of the flap are the same as each other. Thus, when the skins of the flap and a bumper cover are integrated with each other, interference may occur during an operation of the flap. Therefore, there is a need for a device capable of solving the problem.

The related art of the present disclosure is disclosed in Korean Patent Application No. 2011-0134698 published on Dec. 15, 2011 and entitled "Active Air Flap".

The above information disclosed in this Background section is only for enhancement of understanding of the background of the invention and, therefore, it may contain information that does not constitute prior art.

SUMMARY

Exemplary embodiments of the present invention are directed to an active air flap device for a vehicle, in which a rotating shaft and an operating shaft of a flap are designed differently from each other such that a bumper cover and the flap can form the same skin line.

In an embodiment, an active air flap device for a vehicle may include: a housing part mounted in a bumper cover part; one or more flap parts rotatably mounted in the housing part, and exposed to the outside through a hole formed in the bumper cover part so as form the same skin line as the bumper cover part; a link part connected to the flap part; a loader part mounted in the link part; and a driving part configured to rotate the loader part.

The housing part may include: a housing duct part configured to pass fluid, and having the flap part rotatably mounted therein; and a housing coupling part protruding outward from the housing duct part and coupled to the bumper cover part.

The flap part may include: an upper flap part rotatably mounted in the housing part, and configured to cover an open area of the housing part; and a lower flap part disposed under the upper flap part, rotatably mounted in the housing part, and configured to cover the open area of the housing part.

The upper flap part may include: an upper skin configured to cover the open area of the housing part; an upper sidewall formed at either end of the upper skin, and protruding backward; an upper rotating shaft formed in the upper sidewall, and rotatably mounted in the housing part; and an upper operating shaft formed in the upper sidewall, disposed at the rear of the upper rotating shaft, and rotatably coupled to the link part.

The upper sidewall may include: a first upper sidewall extended backward from either end of the upper skin; a second upper sidewall extended upward from the first upper sidewall, and having the upper rotating shaft formed at the top thereof and a third upper sidewall extended backward from the second upper sidewall, and having the upper operating shaft formed outside a rear end thereof.

The lower flap part may include: a lower skin disposed under the upper skin, and configured to cover the open area of the housing part; a lower sidewall formed at either end of the lower skin, and protruding backward; a lower rotating shaft formed in the lower sidewall, and rotatably mounted in the housing part; and a lower operating shaft formed in the lower sidewall, disposed at the rear of the lower rotating shaft, and rotatably coupled to the link part.

The lower sidewall may include: a first lower sidewall extended backward from either end of the lower skin; a second lower sidewall extended upward from the first lower sidewall, and having the lower rotating shaft formed at the top thereof and a third lower sidewall extended backward from the second lower sidewall, and having the lower operating shaft formed inside a rear end thereof.

An upper end of the link part may be mounted so as to rotate with the upper operating shaft, a lower end of the link part may be mounted so as to rotate with the lower operating shaft, and the loader part may be rotatably coupled to the link part.

The distance between the lower sidewalls may be set to a larger value than the distance between the upper sidewalls.

The flap part may include: a flap skin configured to cover an open area of the housing part; a flap sidewall formed at either end of the flap skin; a flap rotating shaft formed in the flap sidewall, and rotatably mounted in the housing part; and a flap operating shaft formed in the flap sidewall, and rotatably coupled to the link part.

In the active air flap device for a vehicle in accordance with the embodiment of the present disclosure, the flap part can be rotated by 90° or more and form the same skin line as the bumper cover part, thereby improving aesthetic sensibility. In particular, the rotating shaft and the operating shaft of the flap part are different from each other. Thus, although the plurality of neighboring flap parts is rotated at the same time, operation interference therebetween can be prevented.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Figure 1:
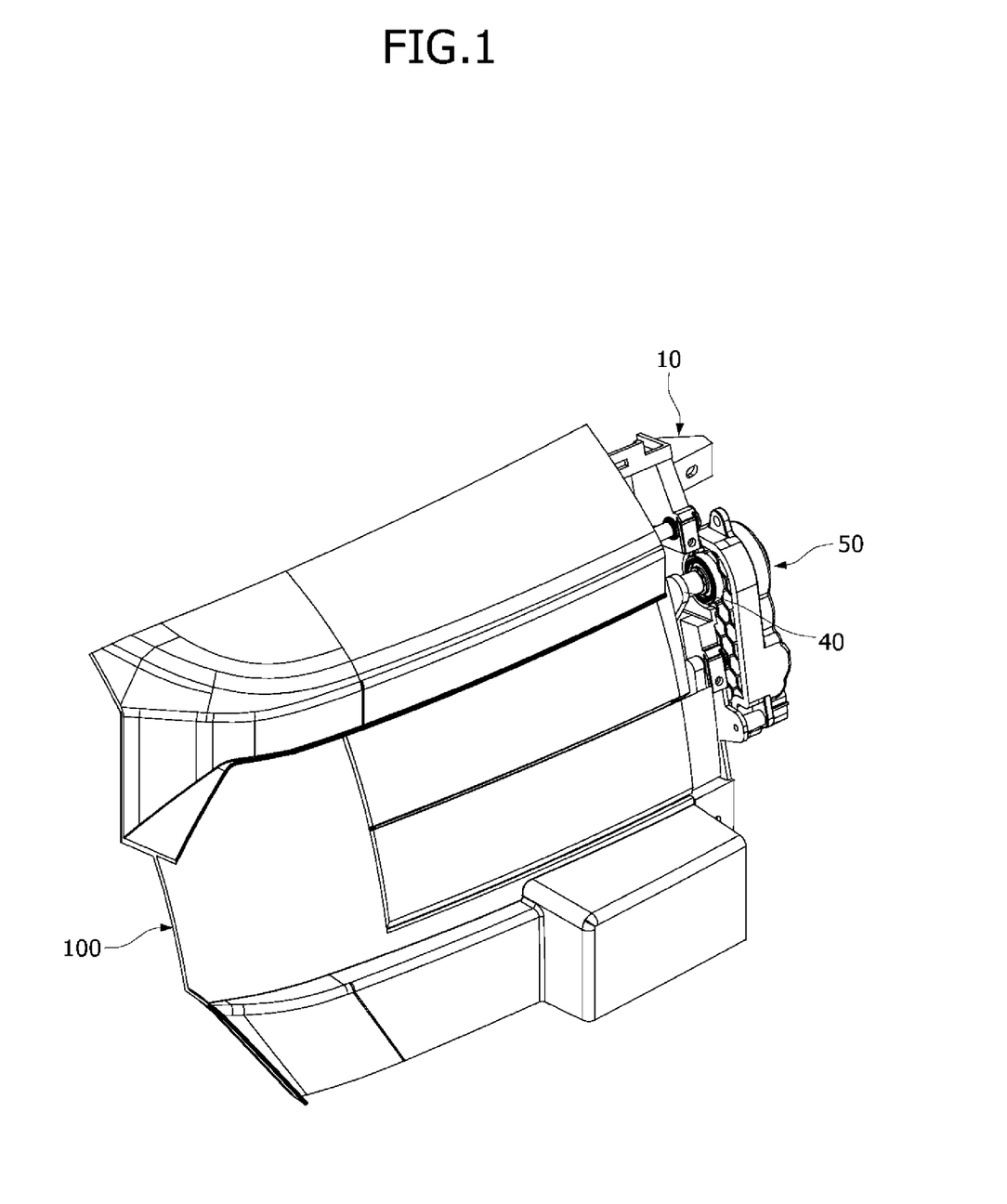
FIG. 1 is a diagram schematically illustrating an active air flap device for a vehicle in accordance with an embodiment of the present disclosure.
Figure 2:
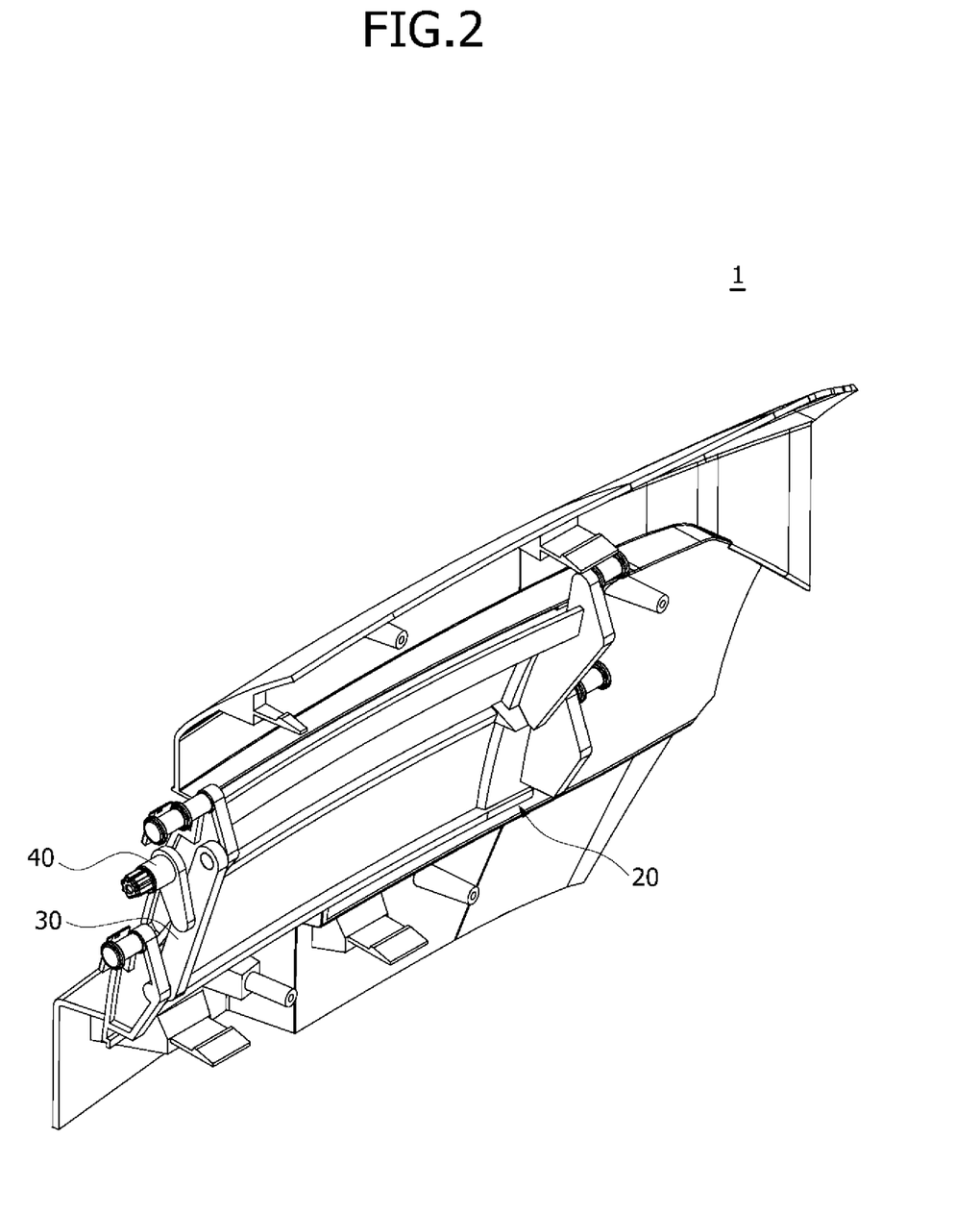
FIG. 2 is a diagram schematically illustrating that the active air flap device for a vehicle in accordance with the embodiment of the present disclosure is mounted in a vehicle.

FIG. 1 is a diagram schematically illustrating an active air flap device for a vehicle in accordance with an embodiment of the present disclosure, and FIG. 2 is a diagram schematically illustrating that the active air flap device for a vehicle in accordance with the embodiment of the present disclosure is mounted in a vehicle. Referring to FIGS. 1 and 2, the active air flap device for a vehicle in accordance with the embodiment of the present disclosure includes a housing part 10, a flap part 20, a link part 30, a loader part 40 and a driving part 50.

The housing part 10 is mounted in a bumper cover part 100. For example, the bumper cover part 100 may be disposed in front of a radiator grill, and the housing part 10 may be mounted inside the bumper cover part 100 to guide external air into an engine room.

The flap part 20 is rotatably mounted on the housing part 10. One or more flap parts 20 are disposed. The flap part 20 is exposed to the outside through a hole formed in the bumper cover part 100 and forms the same skin line as the bumper cover part 100. For example, the flap part 20 may close the housing part 10 and the bumper cover part 100 when a vehicle travels at high speed, thereby reducing resistance to air. Furthermore, when an internal part of the engine room is overheated, the flap part 20 may open the housing part 10 and the bumper cover part 100 and thus lower the internal temperature of the engine room. One flap part 20 may open the housing part 10, or two or more flap parts 20 may be open/close the housing part 10.

The link part 30 is connected to the flap part 20. For example, the link part 30 may connect the plurality of flap parts 20 and provide an operating force for each of the flap parts 20. That is, the link part 30 may connect the pair of upper and lower flap parts 20. The link part 30 may be disposed on one or more of the left and right sides of the flap part 20. In addition, the link part 30 may be connected to one flap part 20 and provide an operating force for the flap part 20.

The loader part 40 is mounted on the link part 30, and the driving part 50 rotates the loader part 40. For example, the driving part 50 may be mounted on the housing part 10 or the vehicle body. When power is applied to the driving part 50, the loader part 40 may be rotated to move the link part 30 upward/downward.

Figure 3:
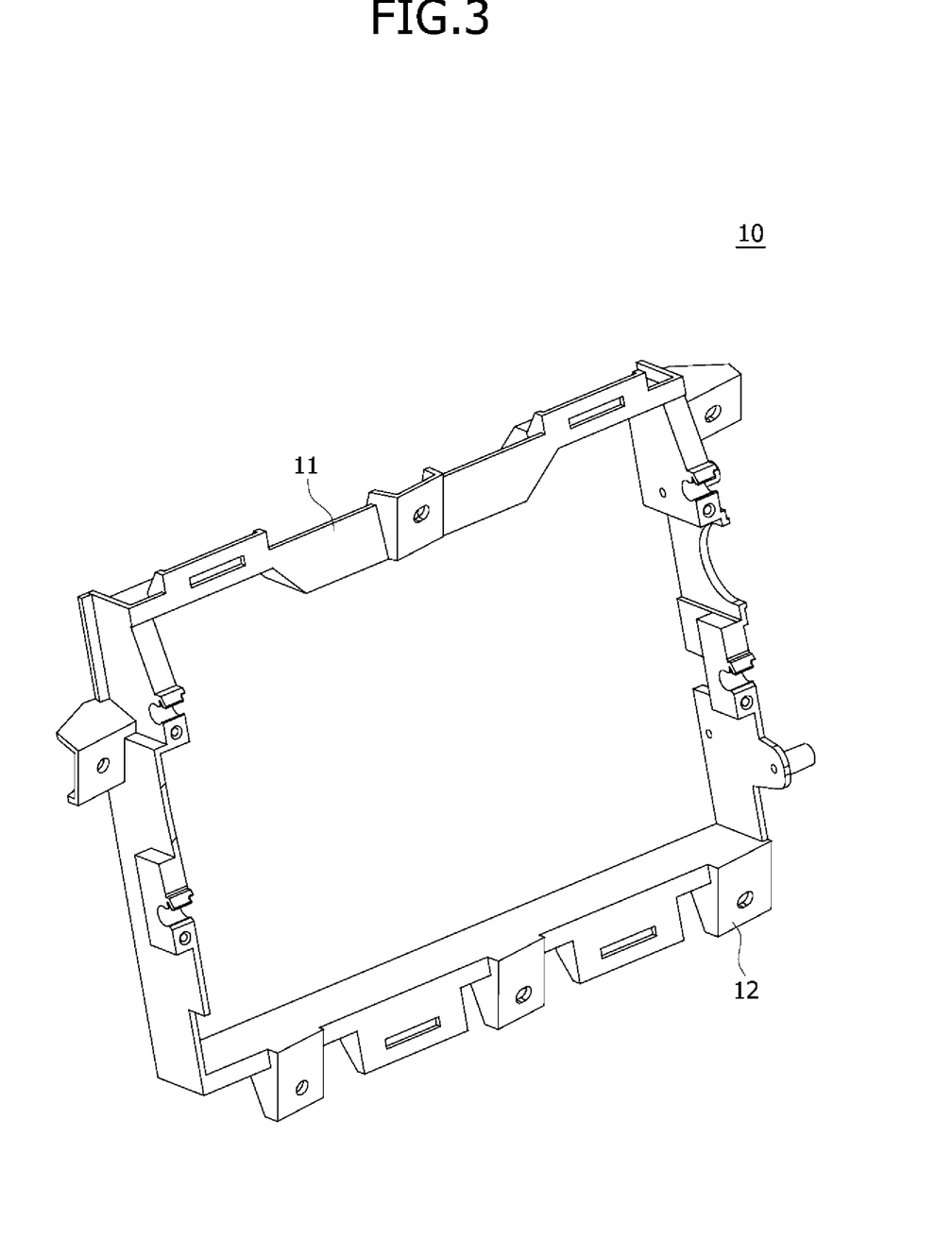
FIG. 3 is a diagram schematically illustrating a housing part in accordance with the embodiment of the present disclosure.

FIG. 3 is a diagram schematically illustrating the housing part in accordance with the embodiment of the present disclosure. Referring to FIG. 3, the housing part 10 in accordance with the embodiment of the present disclosure includes a housing duct part 11 and a housing coupling part 12.

The housing duct part 11 passes fluid and is mounted so that the flap part 20 can rotate. For example, the housing duct part 11 may be formed in a duct shape to pass external air through the inside thereof. The housing coupling part 12 protrudes outward from the housing duct part 11 and is screwed to the bumper cover part 100.

Figure 4:
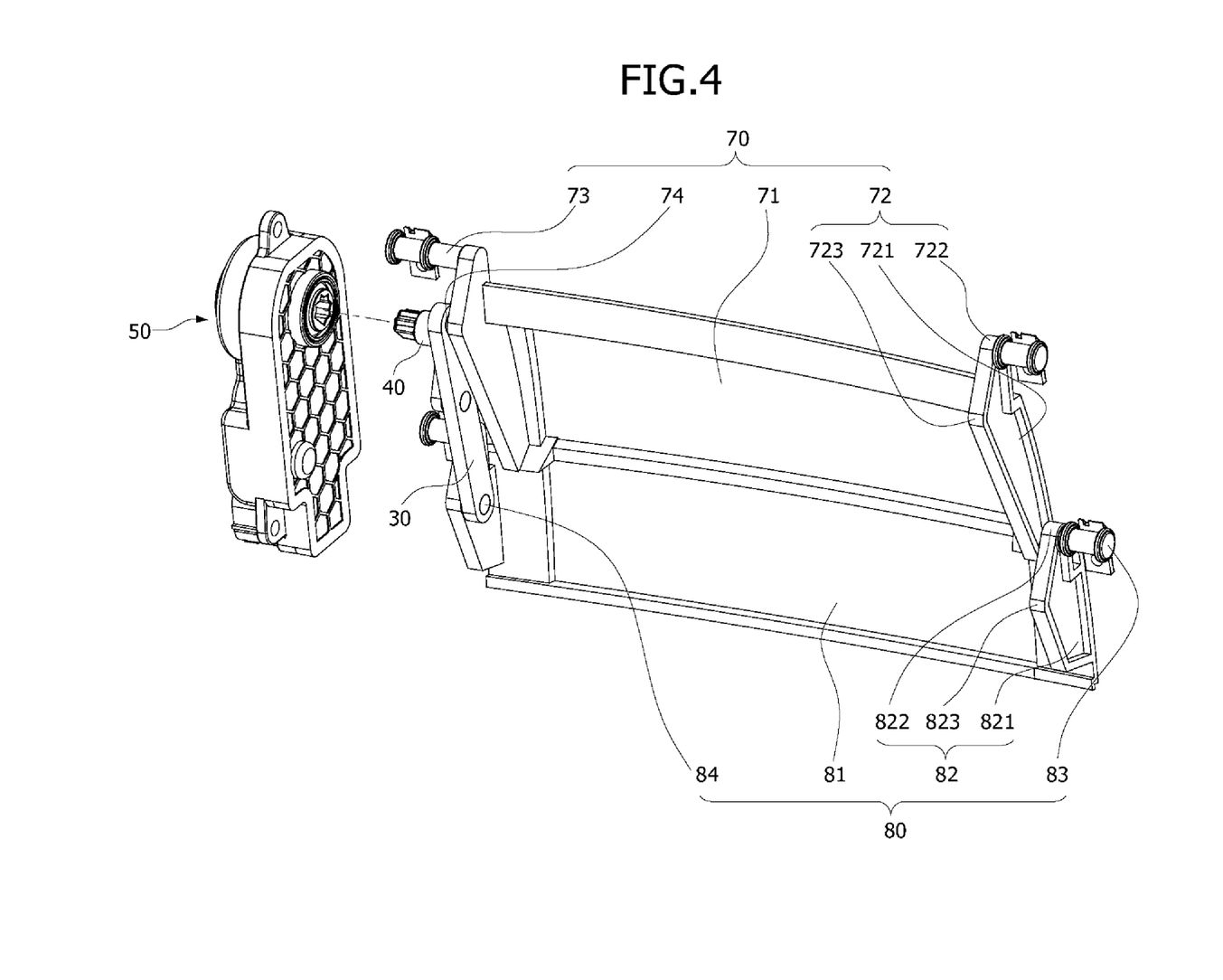
FIG. 4 is a diagram schematically illustrating a flap part in accordance with the embodiment of the present disclosure.

FIG. 4 is a diagram schematically illustrating the flap part in accordance with the embodiment of the present disclosure. Referring to FIG. 4, the flap part 20 in accordance with the embodiment of the present disclosure includes an upper flap part 70 and a lower flap part 80.

The upper flap part 70 is rotatably mounted in the housing part 10 and covers an open area of the housing part 10.

The lower flap part 80 is disposed under the upper flap part 70, rotatably mounted in the housing part 10, and covers the open area of the housing part 10.

The flap part 20 is not limited to a structure in which the upper flap part 70 and the lower flap part 80 are disposed as two stages in the top-to-bottom direction, but only the upper flap part 70 or the lower flap part 80 may be disposed. If necessary, the upper flap part 70 and the lower flap part 80 may be designed as three or more stages.

The upper flap part 70 in accordance with the embodiment of the present disclosure includes an upper skin 71, an upper sidewall 72, an upper rotating shaft 73 and an upper operating shaft 74.

The upper skin 71 covers the open area of the housing part 10. For example, the upper skin 71 may have a front surface which is exposed to the outside while covering the housing part 10.

The upper sidewall 72 is formed on either end of the upper skin 71 and protrudes backward.

The upper rotating shaft 73 is formed on the upper sidewall 72, and rotatably mounted in the housing part 10.

The upper operating shaft 74 is formed in the upper sidewall 72, disposed at the rear of the upper rotating shaft 73, and rotatably coupled to the link part 30.

For example, the upper rotating shaft 73 may serve as a rotating shaft of the upper sidewall 72, and the upper operating shaft 74 may be connected to the link part 30 which is moved upward/downward by rotation of the loader part 40. At this time, the upward/downward movement of the link part 30 may move the upper sidewall 72 upward or downward. Since the upper operating shaft 74 and the upper rotating shaft 73 are not coaxially disposed, the upper sidewall 72 may be rotated about the upper rotating shaft 73 by power applied to the upper sidewall 72.

The upper sidewall 72 in accordance with the embodiment of the present disclosure includes a first upper sidewall 721, a second upper sidewall 722 and a third upper sidewall 723.

The first upper sidewall 721 is extended backward from either end of the upper skin 71, and the second upper sidewall 722 is extended upward from the first upper sidewall 721.

The upper rotating shaft 73 is formed at the top of the second upper sidewall 722. The upper rotating shaft 73 may protrude outward from the second upper sidewall 722. For example, the second upper sidewall 722 may be disposed at the top of the upper skin 71.

The third upper sidewall 723 is extended backward from the second upper sidewall 722, and the upper operating shaft 74 is formed outside a rear end of the third upper sidewall 723. For example, an upper end of the link part 30 may be rotatably mounted on the upper operating shaft 74.

The lower flap part 80 in accordance with the embodiment of the present disclosure includes a lower skin 81, a lower sidewall 82, a lower rotating shaft 83 and a lower operating shaft 84.

The lower skin 81 is disposed under the upper skin 71 and covers the open area of the housing part 10. For example, the lower skin 81 may have a front surface which is exposed to the outside while covering the housing part 10.

The lower sidewall 82 is formed on either end of the lower skin 81 and protrudes backward.

The lower rotating shaft 83 is formed on the lower sidewall 82, and rotatably mounted in the housing part 10.

The lower operating shaft 84 is formed in the lower sidewall 82, disposed at the rear of the lower rotating shaft 83, and rotatably coupled to the link part 30.

For example, the lower rotating shaft 83 may serve as a rotating shaft of the lower sidewall 82, and the lower operating shaft 84 may be connected to the link part 30 which is moved upward/downward by the rotation of the loader part 40. At this time, the upward/downward movement of the link part 30 may move the lower sidewall 82 upward or downward. Since the lower operating shaft 84 and the lower rotating shaft 83 are not coaxially disposed, the lower sidewall 82 may be rotated about the lower rotating shaft 83 by power applied to the lower sidewall 82.

The lower sidewall 82 in accordance with the embodiment of the present disclosure includes a first lower sidewall 821, a second lower sidewall 822 and a third lower sidewall 823.

The first lower sidewall 821 is extended backward from either end of the lower skin 81, and the second lower sidewall 822 is extended upward from the first lower sidewall 821.

The lower rotating shaft 83 is formed at the top of the second lower sidewall 822. The lower rotating shaft 83 may protrude outward from the second lower sidewall 822. For example, the second lower sidewall 822 may be disposed at the top of the lower skin 81.

The third lower sidewall 823 is extended backward from the second lower sidewall 822, and the lower operating shaft 84 is formed inside a rear end of the third lower sidewall 823. For example, a lower end of the link part 30 may be rotatably mounted on the lower operating shaft 84. The loader part 40 may have one end disposed between the upper operating shaft 74 and the lower operating shaft 84, and rotatably coupled to the link part 30.

At this time, the distance between the lower sidewalls 82 may be set to a larger value than the distance between the upper sidewalls 72. That is, the distance between the pair of lower sidewalls 82 may be larger than the distance between the pair of upper sidewalls 72. Thus, when the flap part 20 is closed to block air, the upper end of the lower sidewall 82 may overlap the lower end of the upper sidewall 72.

Figure 5:
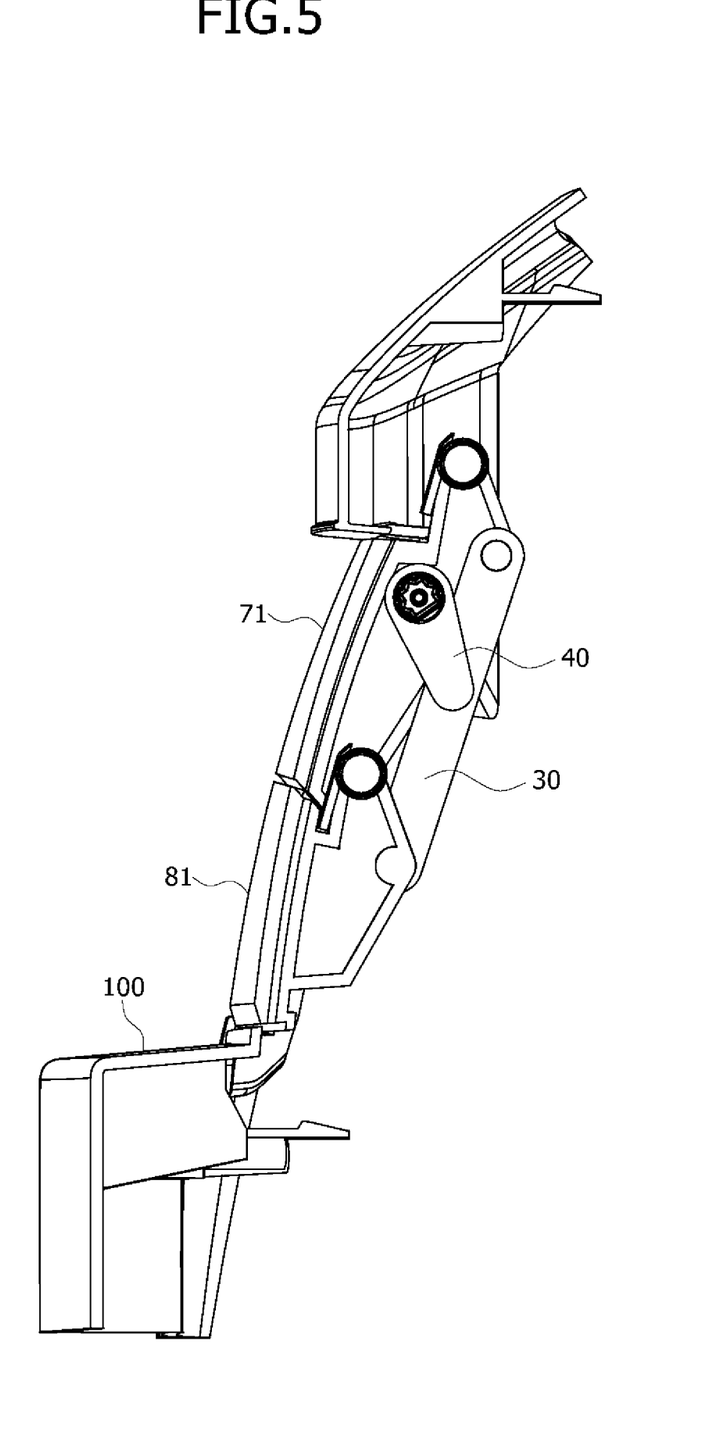
FIG. 5 is a side view schematically illustrating that the flap part in accordance with the embodiment of the present disclosure is closed.
Figure 6:
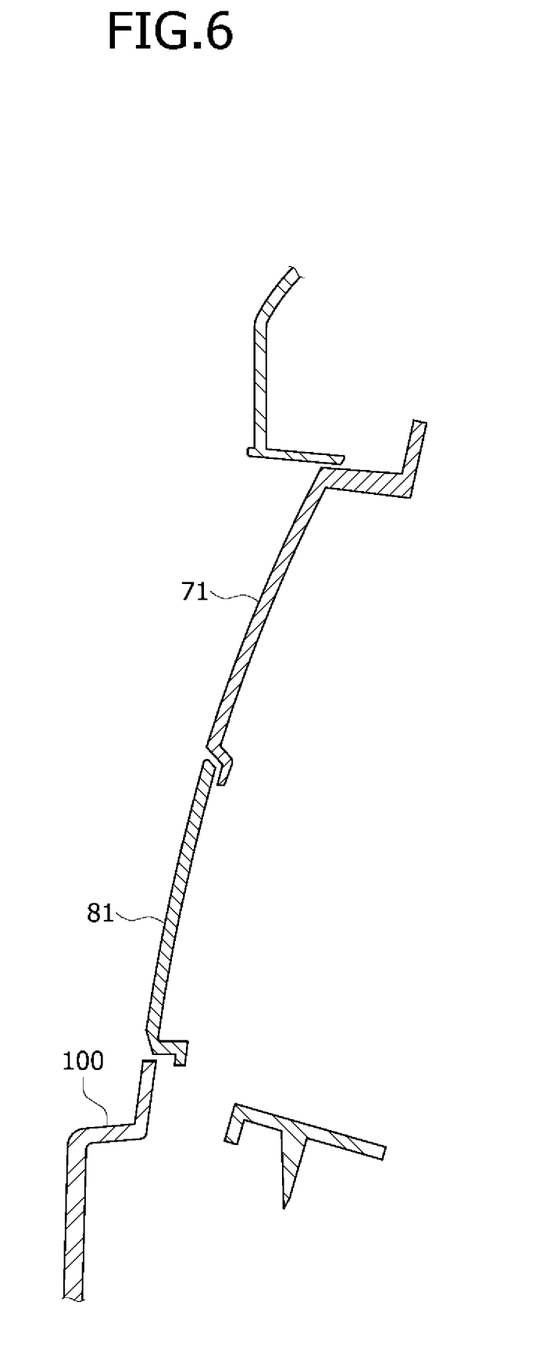
FIG. 6 is a cross-sectional view schematically illustrating the flap part of FIG. 5.
Figure 7:
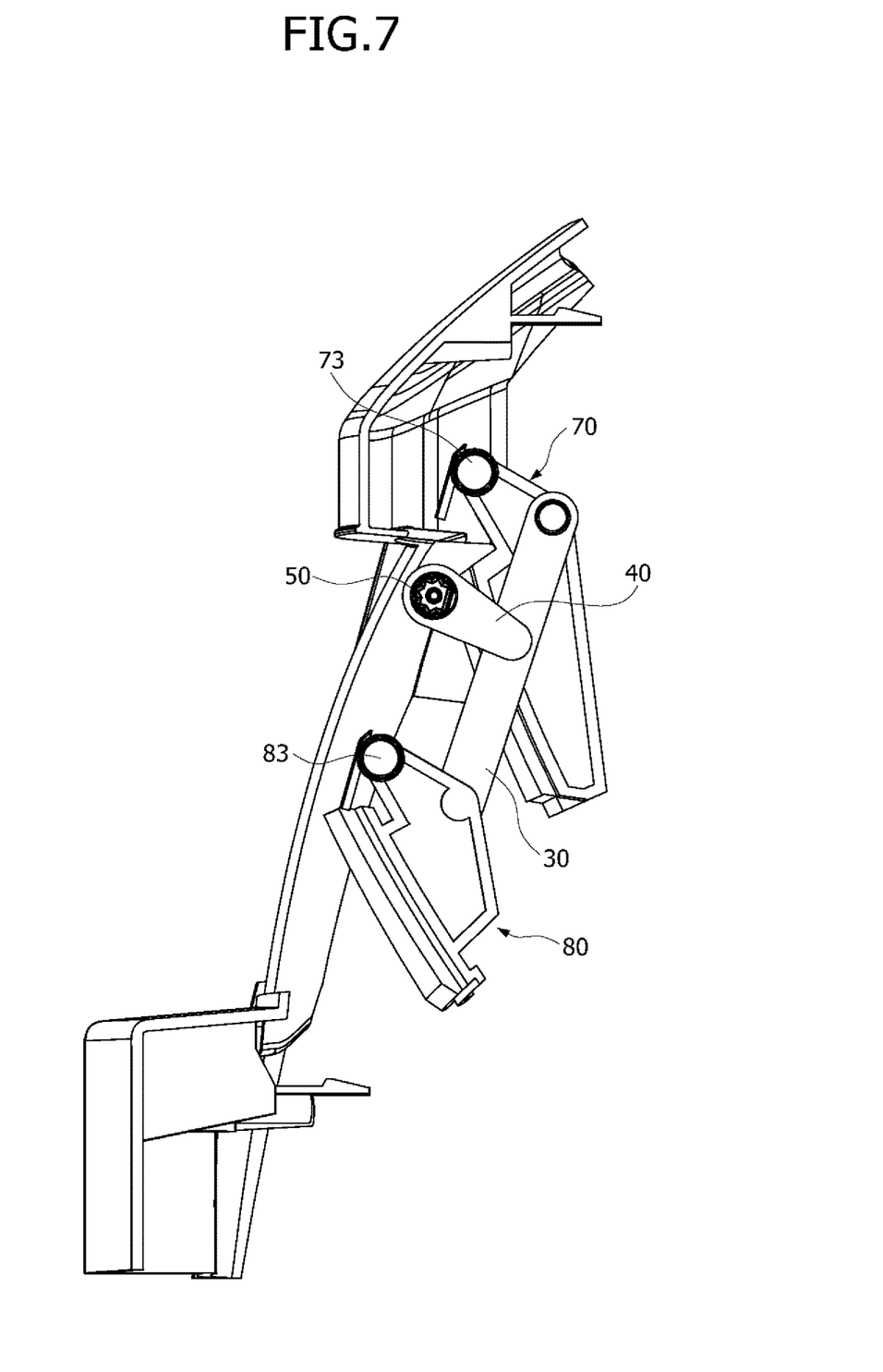
FIG. 7 is a diagram schematically illustrating that the flap part is rotated by 45° in FIG. 5.
Figure 8:
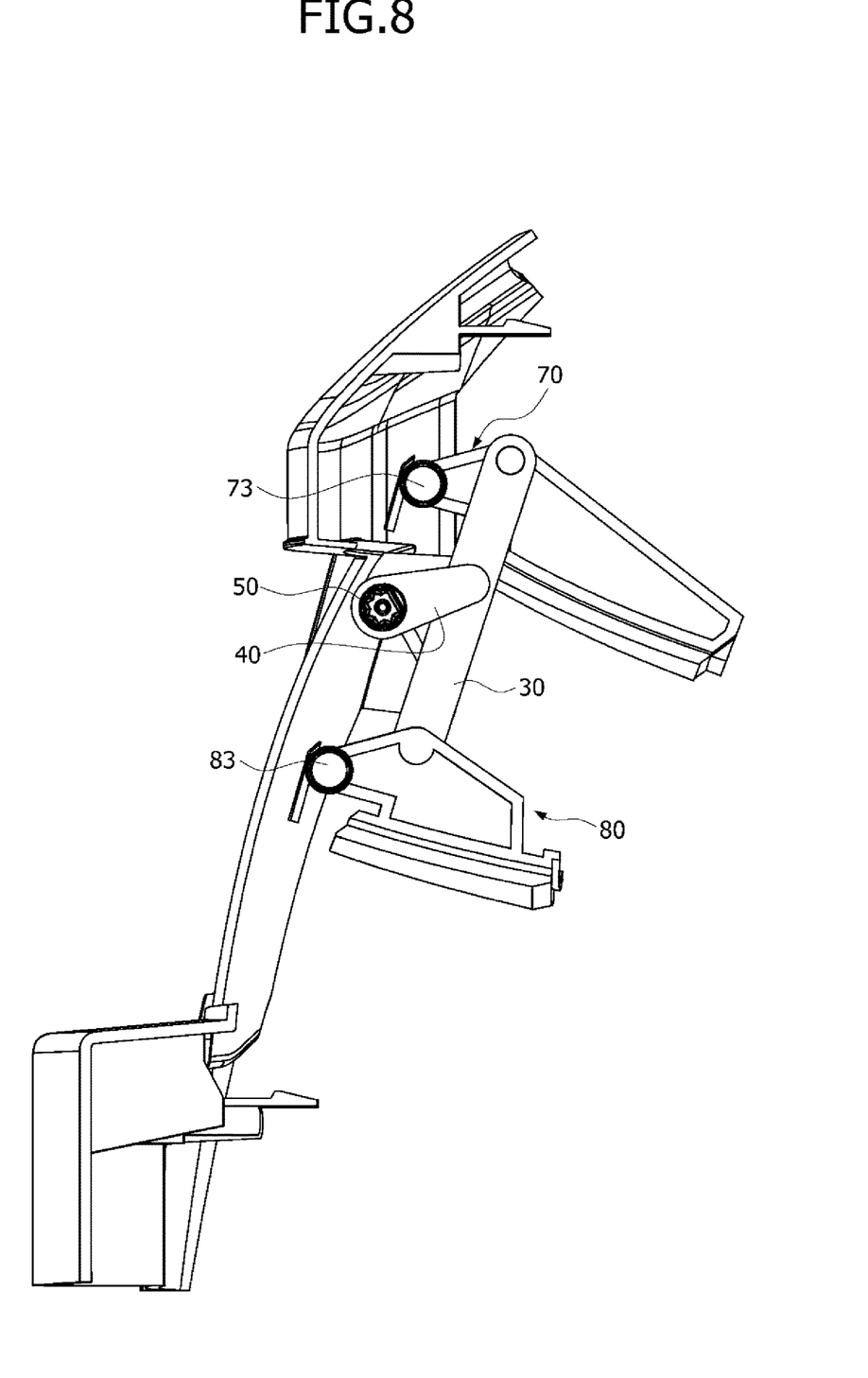
FIG. 8 is a diagram schematically illustrating that the flap part is rotated by 75° in FIG. 5.
Figure 9:
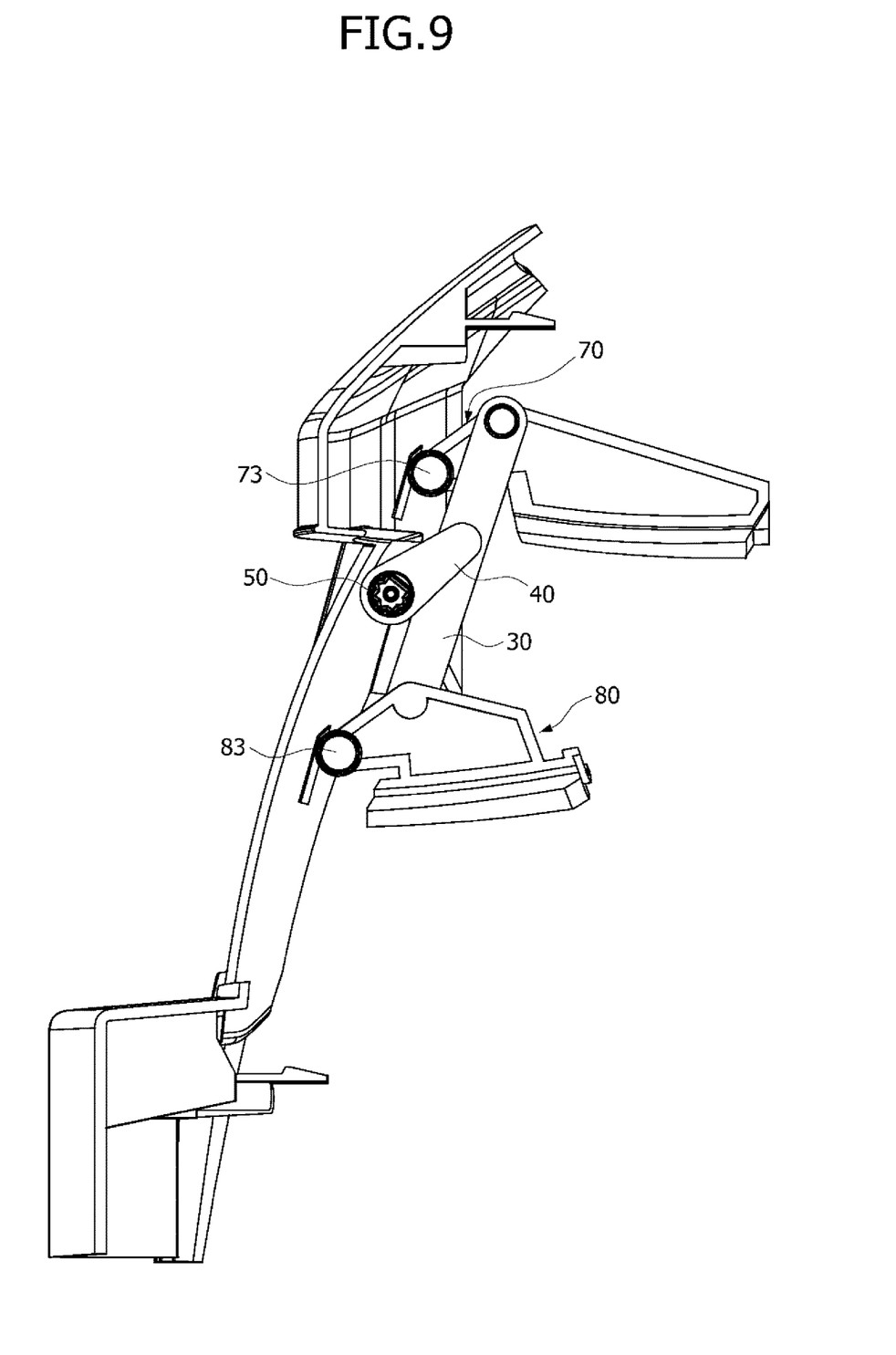
FIG. 9 is a diagram schematically illustrating that the flap part is opened in FIG. 5.

FIG. 5 is a side view schematically illustrating that the flap part in accordance with the embodiment of the present disclosure is closed, and FIG. 6 is a cross-sectional view schematically illustrating the flap part of FIG. 5. FIG. 7 is a diagram schematically illustrating that the flap part is rotated by 45° in FIG. 5, FIG. 8 is a diagram schematically illustrating that the flap part is rotated by 75° in FIG. 5, and FIG. 9 is a diagram schematically illustrating that the flap part is opened in FIG. 5. Referring to FIGS. 5, 6, 7, 8, and 9, the operation of the active air flap device for a vehicle in accordance with the embodiment of the present disclosure will be described as follows.

When the flap part 20 is closed to block an inflow of air, the upper skin 71 of the upper flap part 70 and the lower skin 81 of the lower flap part 80 are contacted with each other in the top-to-bottom direction, and cover the open area of the housing part 10 (see FIGS. 5 and 6). At this time, the upper skin 71 and the lower skin 81 form the same skin line as the bumper cover part 100 to cover the upper and lower skins 71 and 81, and thus maintain the state in which the flap part 20 is exposed to the bumper cover part 100.

In the above-described state, when the driving part 50 is operated to supply air to the engine, the loader part 40 is rotated to move the link part 30 upward (see FIGS. 7, 8, and 9). That is, the upper end of the link part 30 is connected to the upper flap part 70, and the lower end of the link part 30 is connected to the lower flap part 80. When the link part 30 is moved upward, the upper flap part 70 is rotated about the upper rotating shaft 73, and the lower flap part 80 is rotated about the lower rotating shaft 83. Since the rotating shaft and the operating shaft of each of the upper and lower flap parts 70 and 80 are different from each other, the rotating shaft and the operating shaft do not interfere with each other during the operation process.

Figure 10:
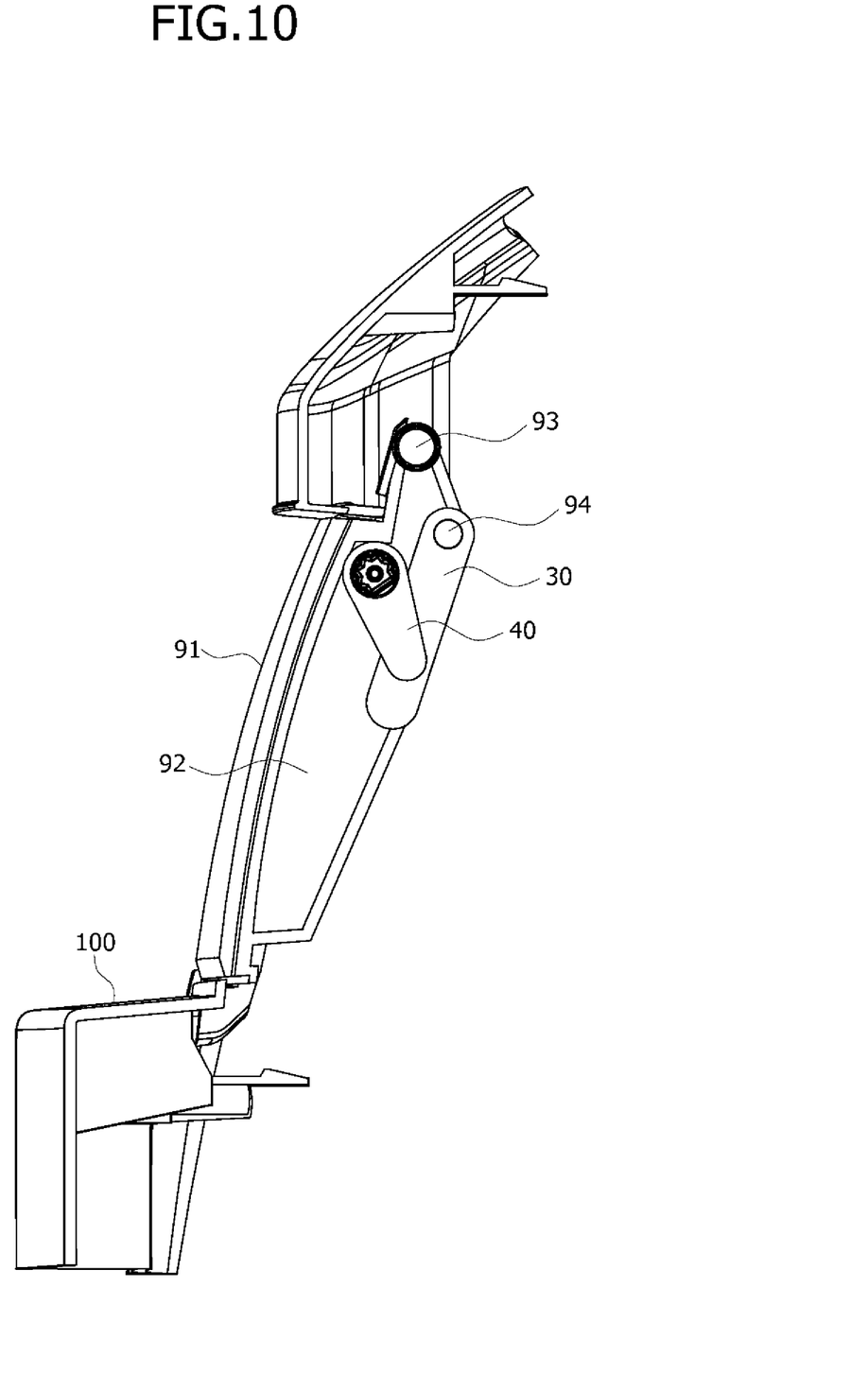
FIG. 10 is a side view schematically illustrating that a flap part in accordance with another embodiment of the present disclosure is closed.

FIG. 10 is a side view schematically illustrating that a flap part in accordance with another embodiment of the present disclosure is closed. Referring to FIG. 10, when one flap part 20 is installed, the flap part 20 may include a flap skin 91, a flap sidewall 92, a flap rotating shaft 93 and a flap operating shaft 94.

The flap skin 91 covers the open area of the housing part 10. For example, the flap skin 91 may have a front surface which is exposed to the outside while covering the housing part 10.

The flap sidewall 92 is formed on either end of the flap skin 91, and protrudes backward.

The flap rotating shaft 93 may be formed on the flap sidewall 92, and rotatably mounted in the housing part 10.

The flap operating shaft 94 may be formed on the flap sidewall 92, disposed at the rear of the flap rotating shaft 93, and rotatably coupled to the link part 30.

For example, the flap rotating shaft 93 may serve as a rotating shaft of the flap sidewall 92, and the flap operating shaft 94 may be connected to the link part 30 which is moved upward/downward by the rotation of the loader part 40. At this time, the upward/downward movement of the link part 30 may move the flap sidewall 92 upward or downward. Since the flap operating shaft 94 and the flap rotating shaft 93 are not coaxially disposed, the flap sidewall 92 may be rotated about the flap rotating shaft 93 by power applied to the flap sidewall 92.

In the active air flap device 1 for a vehicle in accordance with the embodiment of the present disclosure, the flap part 20 can be rotated by 90° or more, and form the same skin line as the bumper cover part 100, thereby improving aesthetic sensibility. In particular, the rotating shaft and the operating shaft of the flap part 20 are different from each other. Thus, although the plurality of neighboring flap parts 20 are rotated at the same time, operation interference therebetween can be prevented.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An active air flap device for a vehicle, comprising:
a housing mounted in a bumper cover;
one or more flaps rotatably mounted in the housing, and exposed to the outside through a hole formed in the bumper cover to form a same skin line as the bumper cover;
a link connected to the one or more flaps;
a loader mounted in the link; and
a driving part configured to rotate the loader,
wherein the one or more flaps comprise:
an upper flap rotatably mounted in the housing, and configured to cover an open area of the housing; and
a lower flap disposed under the upper flap, rotatably mounted in the housing, and configured to cover the open area of the housing,
wherein the upper flap comprises:
an upper skin configured to cover the open area of the housing;
an upper sidewall formed at either end of the upper skin, and protruding backward;
an upper rotating shaft formed in the upper sidewall, and rotatably mounted in the housing; and
an upper operating shaft formed in the upper sidewall, disposed at the rear of the upper rotating shaft, and rotatably coupled to the link.

2. The active air flap device for a vehicle of claim 1, wherein the housing comprises:
a housing duct configured to pass fluid, and having the one or more flaps rotatably mounted therein; and
a housing coupling protruding outward from the housing duct and coupled to the bumper cover.

3. The active air flap device for a vehicle of claim 1, wherein the upper sidewall comprises:
a first upper sidewall extended backward from either end of the upper skin;
a second upper sidewall extended upward from the first upper sidewall, and having the upper rotating shaft formed at the top thereof; and
a third upper sidewall extended backward from the second upper sidewall, and having the upper operating shaft formed outside a rear end thereof.

4. The active air flap device for a vehicle of claim 1, wherein the lower flap comprises:
a lower skin disposed under the upper skin, and configured to cover the open area of the housing;
a lower sidewall formed at either end of the lower skin, and protruding backward;
a lower rotating shaft formed in the lower sidewall, and rotatably mounted in the housing; and
a lower operating shaft formed in the lower sidewall, disposed at the rear of the lower rotating shaft, and rotatably coupled to the link.

5. The active air flap device for a vehicle of claim 4, wherein the lower sidewall comprises:
a first lower sidewall extended backward from either end of the lower skin;
a second lower sidewall extended upward from the first lower sidewall, and having the lower rotating shaft formed at the top thereof; and
a third lower sidewall extended backward from the second lower sidewall, and having the lower operating shaft formed inside a rear end thereof.

6. The active air flap device for a vehicle of claim 4, wherein an upper end of the link is mounted to rotate with the upper operating shaft,
a lower end of the link is mounted to rotate with the lower operating shaft, and
the loader is rotatably coupled to the link.

7. The active air flap device for a vehicle of claim 4, wherein the distance between the lower sidewalls is set to a larger value than the distance between the upper sidewalls.

8. An active air flap device for a vehicle, comprising:
a housing mounted in a bumper cover;
a flap rotatably mounted in the housing, and exposed to the outside through a hole formed in the bumper cover to form a same skin line as the bumper cover;
a link connected to the one or more flaps;
a loader mounted in the link; and
a driving part configured to rotate the loader,
wherein the flap comprises:
a flap skin configured to cover an open area of the housing;

a flap sidewall formed at either end of the flap skin;
a flap rotating shaft formed in the flap sidewall, and rotatably mounted in the housing; and
a flap operating shaft formed in the flap sidewall, and rotatably coupled to the link.

* * * * *